United States Patent
Kuroda et al.

(10) Patent No.: US 11,892,540 B2
(45) Date of Patent: Feb. 6, 2024

(54) VEHICLE-MOUNTED RADAR SYSTEM

(71) Applicant: Hitachi Automotive Systems, Ltd., Hitachinaka (JP)

(72) Inventors: Masayoshi Kuroda, Hitachinaka (JP); Kosuke Sakata, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 435 days.

(21) Appl. No.: 17/266,818

(22) PCT Filed: Jul. 26, 2019

(86) PCT No.: PCT/JP2019/029369
§ 371 (c)(1),
(2) Date: Feb. 8, 2021

(87) PCT Pub. No.: WO2020/049892
PCT Pub. Date: Mar. 12, 2020

(65) Prior Publication Data
US 2021/0349208 A1    Nov. 11, 2021

(30) Foreign Application Priority Data

Sep. 3, 2018    (JP) .................................. 2018-164736

(51) Int. Cl.
*G01S 13/93*    (2020.01)
*G01S 13/86*    (2006.01)
(Continued)

(52) U.S. Cl.
CPC .......... *G01S 13/931* (2013.01); *G01S 13/865* (2013.01); *G01S 17/86* (2020.01); *G01S 2013/9327* (2020.01)

(58) Field of Classification Search
CPC ....... G01S 13/931; G01S 13/865; G01S 17/86
See application file for complete search history.

(56) References Cited

U.S. PATENT DOCUMENTS

| 5,798,942 A * | 8/1998 | Danchick | .............. | G01S 3/7864 |
| | | | | 342/36 |
| 2006/0215148 A1 | 9/2006 | Yamaguchi et al. | | |

(Continued)

FOREIGN PATENT DOCUMENTS

| CN | 106872995 A | 6/2017 |
| JP | 6-308225 A | 11/1994 |

(Continued)

OTHER PUBLICATIONS

International Search Report (PCT/ISA/210) issued in PCT Application No. PCT/JP2019/029369 dated Nov. 26, 2019 with English translation (five (5) pages).

(Continued)

*Primary Examiner* — Timothy A Brainard
*Assistant Examiner* — Helena H Seraydaryan
(74) *Attorney, Agent, or Firm* — Crowell & Moring LLP (57) ABSTRACT

To provide a vehicle-mounted radar system capable of improving object detection performance depending on a situation. The vehicle-mounted radar system includes laser radars 2A to 2D that irradiate the surroundings of a vehicle 1 with a laser beam and receive light reflected by an object around the vehicle 1, and a control device 3 that controls the laser radars 2A to 2D and recognizes an object based on light reception results of the laser radars 2A to 2D. The control device 3 determines whether a laser beam of any of the laser radars 2A to 2D is blocked by the object, and thus an undetected area is created, based on a recognition result of the object. Thus, for example, when the laser beam of the laser radar 2B is blocked by another vehicle 10, and thus an undetected area 11 is created, a detection range of the laser radar 2A adjacent to the laser radar 2B is expanded so that at least a portion of the undetected area 11 is allowed to be detected.

3 Claims, 13 Drawing Sheets (51) Int. Cl.
  *G01S 17/86* (2020.01)
  *G01S 13/931* (2020.01)

(56) References Cited

U.S. PATENT DOCUMENTS

| | | |
|---|---|---|
| 2016/0146941 A1 | 5/2016 | Hassenpflug et al. |
| 2018/0039273 A1 | 2/2018 | Delp et al. |
| 2018/0252812 A1 | 9/2018 | Kitano |
| 2019/0011538 A1 | 1/2019 | Schwarz et al. |
| 2019/0285726 A1 | 9/2019 | Muto |
| 2020/0150234 A1 | 5/2020 | Miki |

FOREIGN PATENT DOCUMENTS

| | | |
|---|---|---|
| JP | 10-170221 A | 6/1998 |
| JP | 2000-321350 A | 11/2000 |
| JP | 2006-258604 A | 9/2006 |
| JP | 2010-018244 A | 1/2010 |
| JP | 2011-112503 A | 6/2011 |
| WO | WO 2017/108247 A1 | 6/2017 |
| WO | WO 2018/079297 A1 | 5/2018 |
| WO | WO 2017/060977 A | 7/2018 |
| WO | WO 2018/150591 A | 8/2018 |

OTHER PUBLICATIONS

Japanese-language Written Opinion (PCT/ISA/237) issued in PCT Application No. PCT/JP2019/029369 dated Nov. 26, 2019 (three (3) pages).

Japanese-language Office Action issued in Japanese Application No. 2020-541058 dated Jan. 25, 2022 (four (4) pages).

Chinese-language Office Action issued in Chinese Application No. 201980047043.6 dated Dec. 6, 2023 with English translation (10 ages).

* cited by examiner

VEHICLE-MOUNTED RADAR SYSTEM

TECHNICAL FIELD

The present invention relates to a vehicle-mounted radar system including a plurality of laser radars and a control device.

BACKGROUND ART

PTL 1 discloses a vehicle-mounted radar system including a plurality of laser radars (LIDAR: Light Detection And Ranging) and a control device. The plurality of laser radars irradiate the surroundings of the vehicle with a laser beam and receive the light reflected by an object around the vehicle. The control device acquires at least one of the distance and the angle to the object based on the light reception results of the plurality of laser radars.

CITATION LIST

Patent Literature

PTL 1: International Publication No. 2017/060977

SUMMARY OF INVENTION

Technical Problem

In PTL 1, the detection range and the detection timing of each of the plurality of laser radars are fixed. However, if the detection range or the detection timing of the laser radar is changed depending on the situation, it is possible to improve object detection performance. More specifically, for example, there is a concern that the laser beam of one laser radar may be blocked by an object, and thus an undetected area is created. In such a case, if the detection range of another laser radar adjacent to the one laser radar is expanded, it is possible to detect at least a portion of the undetected area.

An object of the present invention is to provide a vehicle-mounted radar system capable of improving object detection performance depending on a situation.

Solution to Problem

In order to achieve the above object, according to the representative present invention, a vehicle-mounted radar system includes a plurality of laser radars that irradiate a surrounding of a vehicle with a laser beam and receive light reflected by an object around the vehicle, and a control device that controls the plurality of laser radars and recognizes the object based on light reception results of the plurality of laser radars. The control device determines whether or not the laser beam of any of the plurality of laser radars is blocked by the object, and thus an undetected area is created, based on a recognition result of the object, and, when the laser beam of one of the plurality of laser radars is blocked by the object, and thus the undetected area is created, expands a detection range of another laser radar adjacent to the one laser radar so that at least a portion of the undetected area is allowed to be detected.

Advantageous Effects of Invention

According to the present invention, it is possible to improve object detection performance depending on a situation.

DESCRIPTION OF EMBODIMENTS

A first embodiment of the present invention will be described with reference to the drawings.

Figure 1:
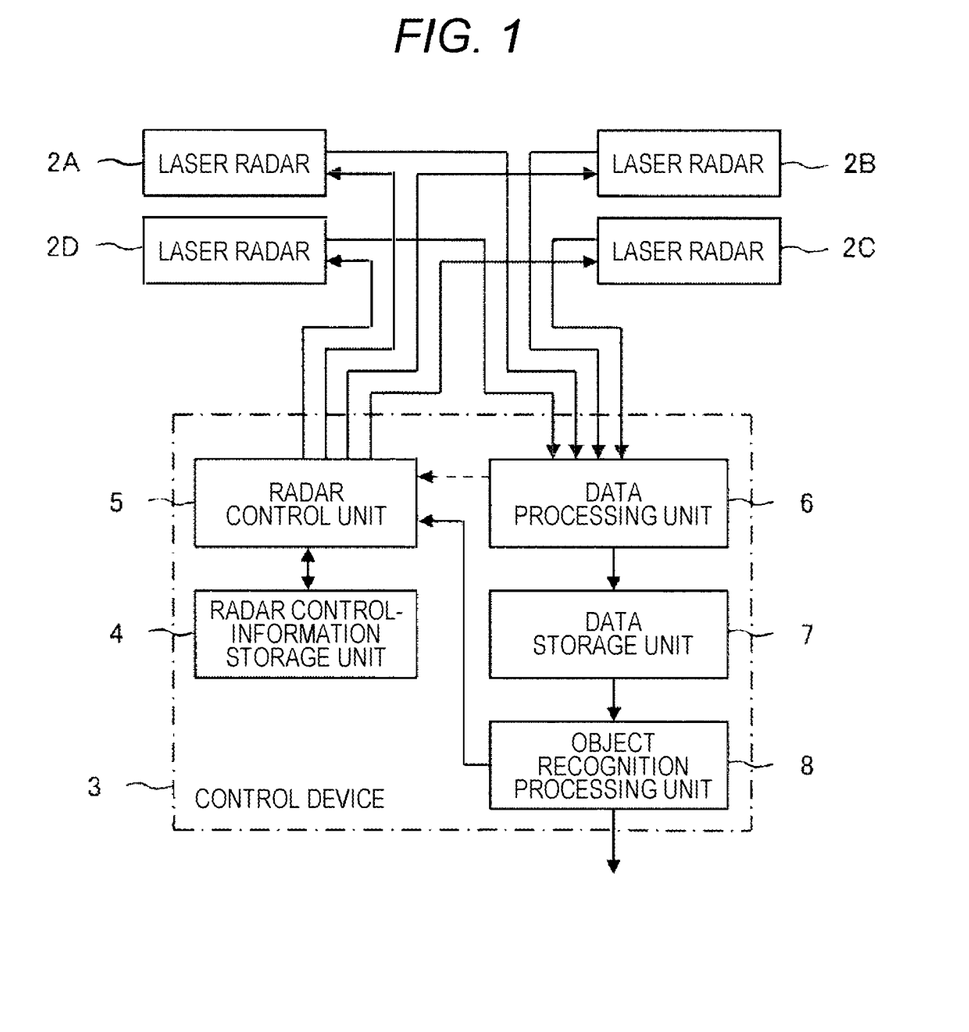
FIG. 1 is a block diagram illustrating a configuration of a vehicle-mounted radar system according to a first embodiment of the present invention.
Figure 2:
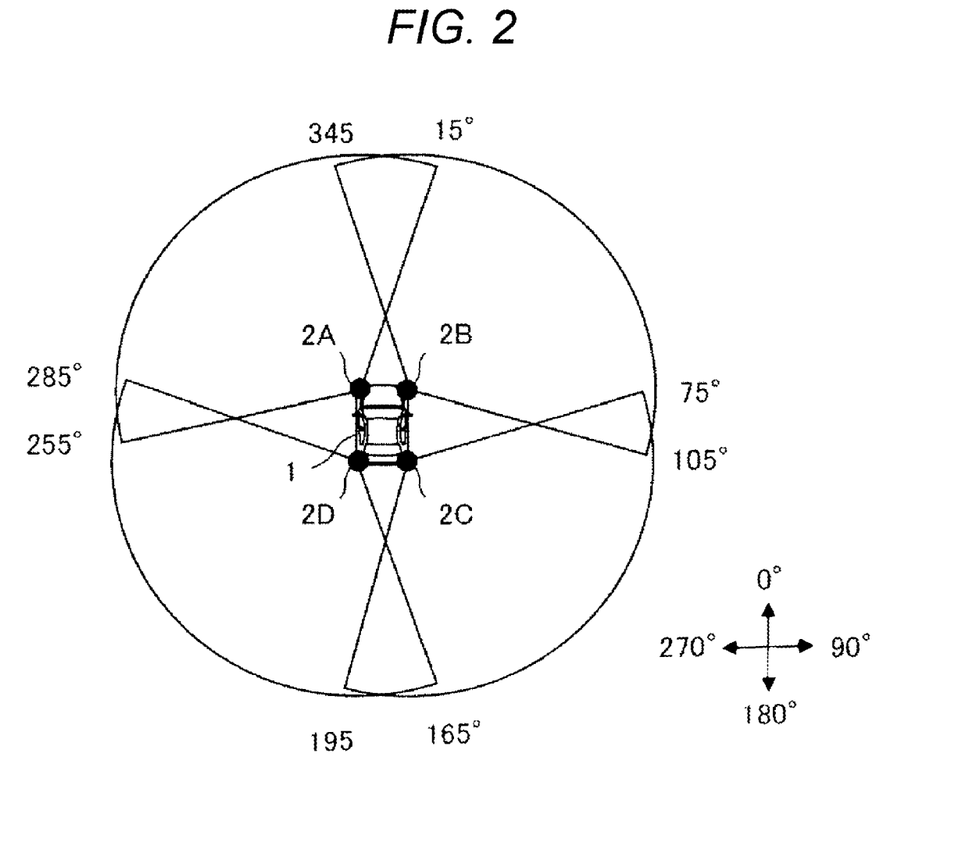
FIG. 2 is a top view of a vehicle illustrating an arrangement and a detection range of a laser radar in the first embodiment of the present invention.

FIG. 1 is a block diagram illustrating a configuration of a vehicle-mounted radar system according to a first embodiment of the present invention. FIG. 2 is a top view of a vehicle illustrating an arrangement and a detection range of a laser radar in the first embodiment of the present invention. Note that, a fan shape in FIG. 2 indicates a laser beam irradiation direction as the detection range of each laser radar, and the laser beam irradiation distance is illustrated to be shorter than the actual one (the same is applied to the fan shape in other drawings).

In the present embodiment, a vehicle-mounted radar system is mounted on a vehicle 1, and includes, for example, four laser radars 2A to 2D and a control device 3. The laser radars 2A to 2D are arranged at a front left corner, a front right corner, a rear right corner, and a rear left corner of vehicle 1, respectively, for example, as illustrated in FIG. 2. The laser radars are designed to detect all surroundings (all directions).

Each of the laser radars includes, for example, an irradiation unit that performs an irradiation with a laser beam and a rotation mechanism that rotates the irradiation unit. The laser radar controls the rotation angle of the irradiation unit and controls whether or not the irradiation of the laser beam is performed, and thus performs scanning of the surroundings of the vehicle 1 with changing an irradiation direction (in the present embodiment, horizontal angle of the laser beam) of the laser beam. In the present specification, the horizontal angle of the laser beam is defined to increase clockwise with a forward direction of the vehicle 1 as 0°. Each of the laser radars receives light reflected by an object around the vehicle 1, and transmits the received light result (in detail, direction and distance of a reflection point based on the position of the laser radar) to the control device 3.

The control device 3 is configured by a computer or the like, and includes a radar control-information storage unit 4, a radar control unit 5, a data processing unit 6, a data storage unit 7, and an object recognition processing unit 8 as functional components.

The radar control-information storage unit 4 in the control device 3 stores, in advance, initial setting values of detection ranges (in the present embodiment, changeable range of the horizontal angle of the laser beam) of the laser radars 2A to 2D, as control information of the laser radars 2A to 2D. For example, as illustrated in FIG. 2, the initial setting value of the detection range of the laser radar 2A is 255° to 15°. The initial setting value of the detection range of the laser radar 2B is 345° to 105°. The initial setting value of the detection range of the laser radar 2C is 75° to 195°. The initial setting value of the detection range of the laser radar 2D is 165° to 285°. The radar control unit 5 in the control device 3 usually controls the laser radars 2A to 2D based on the initial setting values of the detection ranges of the laser radars 2A to 2D, which are stored in the radar control-information storage unit 4.

The data processing unit 6 in the control device 3 calculates positions of a plurality of reflection points in a three-dimensional coordinate system based on the center position of the vehicle 1 as a reference, based on data from the laser radars 2A to 2D (in detail, directions and distances of the plurality of reflection points based on the position of any of the laser radars 2A to 2D as a reference). Thus, point group data configured by pieces of position information of a plurality of reflection points is generated and stored in the data storage unit 7.

The object recognition processing unit 8 in the control device 3 recognizes an object around the vehicle 1 based on the point group data stored in the data storage unit 7. In detail, the object recognition processing unit 8 extracts a portion representing the characteristics of the object, such as a region where a plurality of reflection points are gathered or a straight line portion, and recognizes what is the object in consideration of the size of the portion. The object recognition processing unit 8 transmits an object recognition result to another control device (specifically, for example, control device that executes a process of integrating a camera image and the object recognition result).

Here, as a major feature of the present embodiment, the object recognition processing unit 8 in the control device 3 determines whether or not the laser beam of any of the laser radars 2A to 2D is blocked, and thus an undetected area is created, based on the above-described object recognition result. When the laser beam of the one of the laser radars 2A to 2D is blocked by the object, and thus the undetected area is created, the radar control unit 5 in the control device 3 expands the detection range of another laser radar adjacent to the one laser radar so that at least a portion of the undetected area can be detected.

Figure 3:
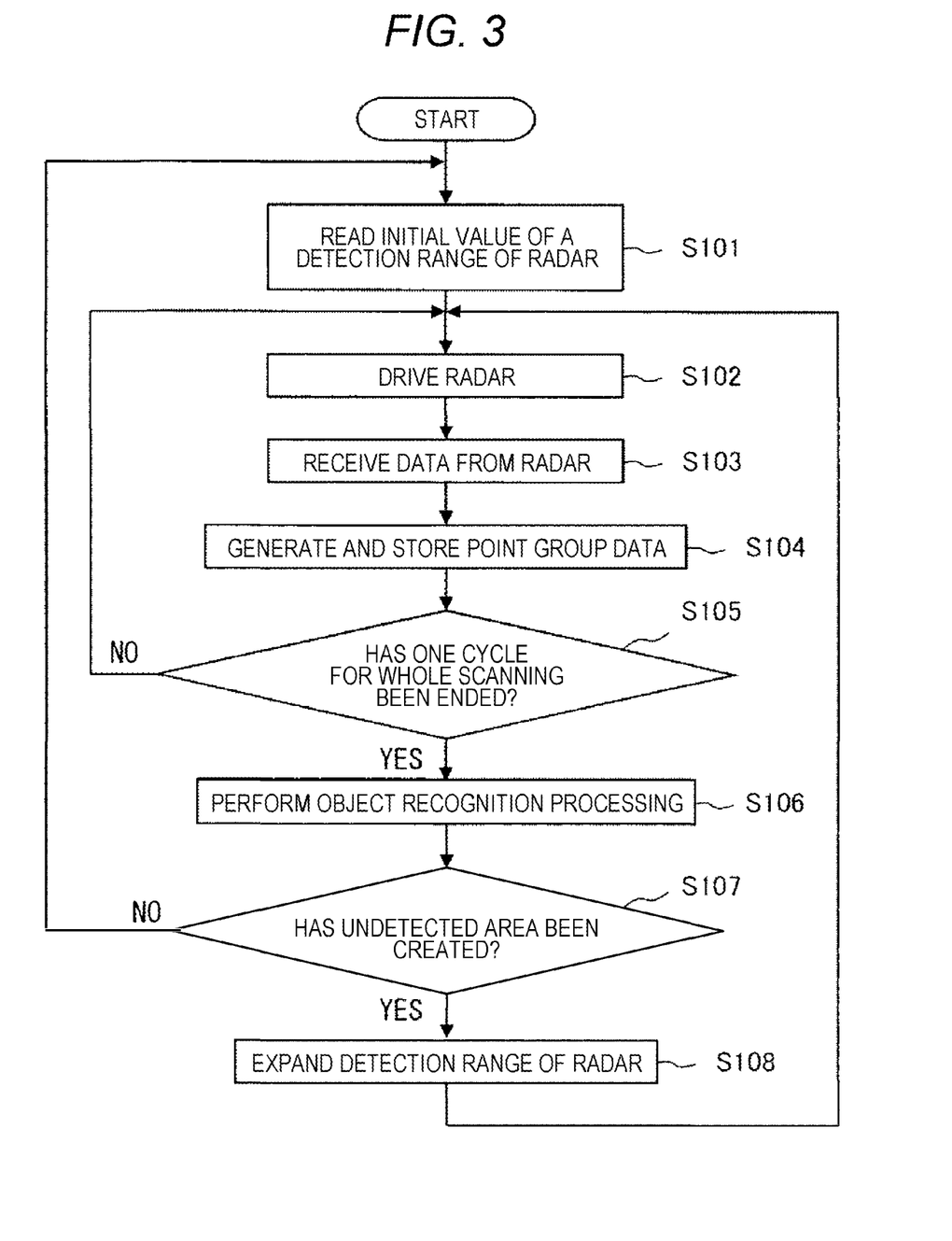
FIG. 3 is a flowchart illustrating a processing content of a control device in the first embodiment of the present invention.

Next, the processing content of the control device 3 in the present embodiment will be described. FIG. 3 is a flowchart illustrating the processing content of the control device in the first embodiment of the present invention.

Firstly, in Steps S101 and S102, the radar control unit 5 in the control device 3 reads the initial setting values of the detection ranges of the laser radars 2A to 2D stored in the radar control-information storage unit 4, and drives the radars 2A to 2D based on the initial setting values. Then, the process proceeds to Steps S103 and S104. The data processing unit 6 in the control device 3 receives the data from the laser radars 2A to 2D, generates point group data based on the received data, and stores the generated data in the data storage unit 7. Until one cycle of the entire scanning by the laser radars 2A to 2D is completed, the determination in Step S105 becomes NO, and the processes in Steps S102 to S104 are repeated. When one cycle of the entire scanning by the laser radars 2A to 2D has been completed, the determination in Step S105 becomes YES, and the process proceeds to Step S106.

Figure 4:
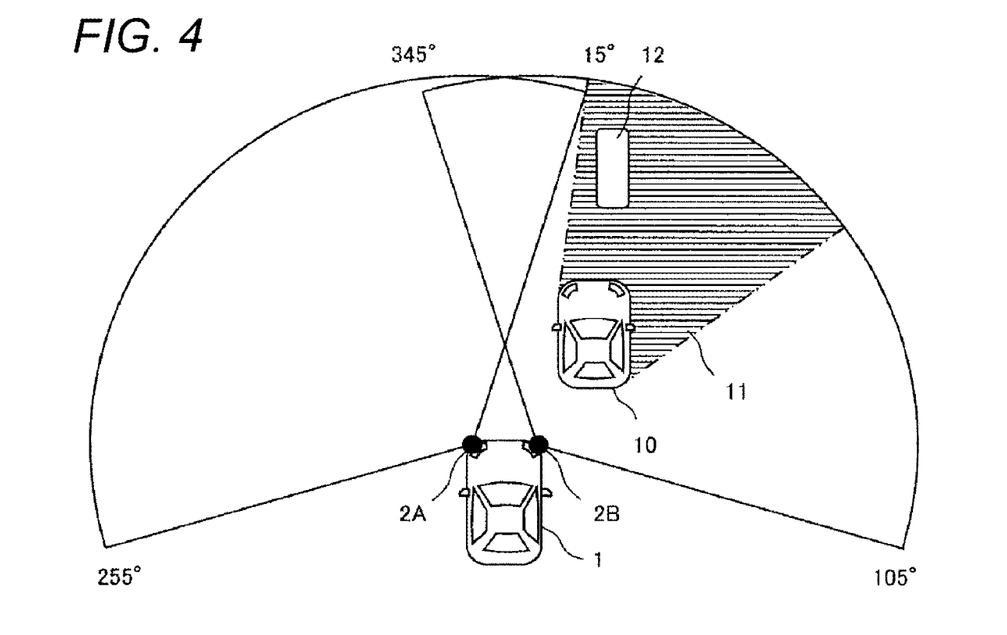
FIG. 4 is a top view of a vehicle illustrating a specific example of an undetected area in the first embodiment of the present invention.

In Step S106, the object recognition processing unit 8 in the control device 3 recognizes an object around the vehicle 1 based on the point group data stored in the data storage unit 7. Then, the process proceeds to Step S107. The object recognition processing unit 8 in the control device 3 determines whether or not the laser beam of any of the laser radars 2A to 2D is blocked, and thus an undetected area is created, based on the object recognition result. For example, when the undetected area is not created, the determination in Step S107 becomes NO, and the process proceeds to Step S101 described above. On the other hand, for example, as illustrated in FIG. 4, when the laser beam of the laser radar 2B is blocked by another vehicle 10 (object) and thus the undetected area 11 is created, the determination in Step S107 becomes YES, and the process proceeds to Step S108.

In Step S108, the radar control unit 5 in the control device 3 selects another laser radar adjacent to one laser radar in accordance with the position of the undetected area created by blocking the laser beam of the one laser radar by an object. In addition, the radar control unit expands the detection range of the selected laser radar so that at least a portion of the undetected area can be detected.

Figure 5:
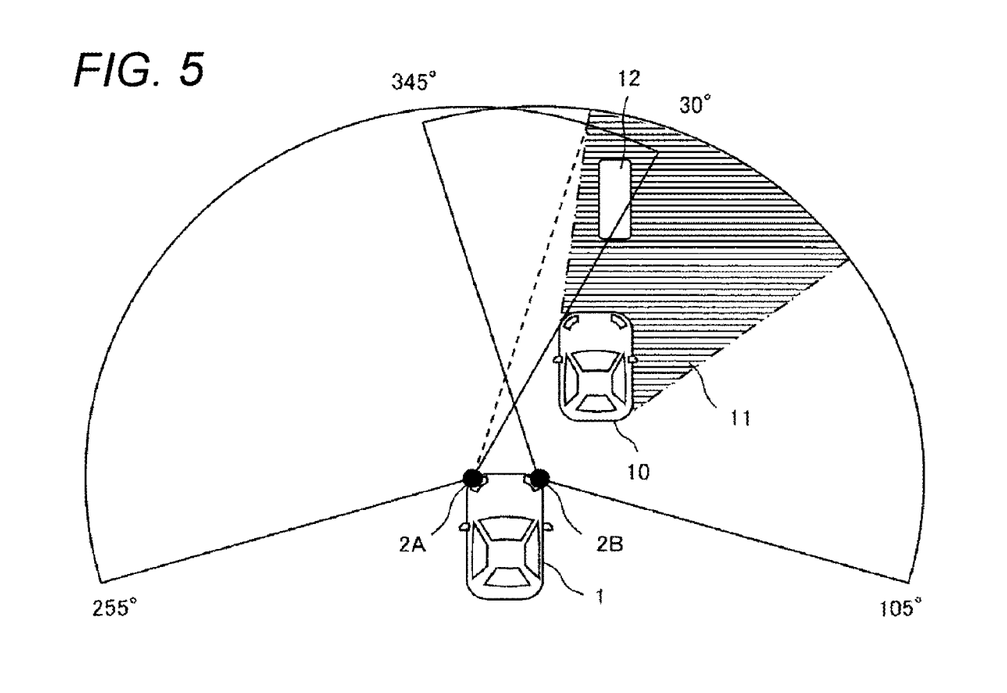
FIG. 5 is a top view of a vehicle illustrating a specific example of expanding the detection range of the laser radar in the first embodiment of the present invention.

Specifically, for example, as illustrated in FIG. 5, if the undetected area 11 created by the laser beam of the laser radar 2B blocked by another vehicle 10 is created closer to the laser radar 2A, the radar control unit selects the laser radar 2A, and expands the range of the laser radar 2A to a range of 255° to 30° so that at least a portion of the undetected area 11 can be detected. Note that, the expansion amount of the detection range may be calculated based on the position of the object or the undetected area, or may be a preset value.

Then, the radar control unit 5 in the control device 3 stores the changed setting value of the detection range of the laser radar in the radar control-information storage unit 4. Then, the process proceeds to Step S102. The radar control unit 5 drives the radars 2A to 2D based on the changed setting value or the initial setting value of the detection range of the laser radars 2A to 2D, which are stored in the radar control-information storage unit 4.

As described above, in the present embodiment, when the laser beam of one laser radar is blocked by an object and the undetected area is created, the detection range of another laser radar adjacent to the one laser radar is expanded. Therefore, at least a portion of the undetected area can be detected. Specifically, for example, as illustrated in FIG. 5, it is possible to detect an object 12 in the undetected area 11 by expanding the detection range of the laser radar 2A. Therefore, it is possible to improve the object detection performance. When the undetected area is not created, the detection range of the laser radar is not expanded, so that it is possible to reduce the processing load of the control device 3.

A second embodiment of the present invention will be described with reference to FIGS. 6 and 7. Note that, in the present embodiment, the portions equivalent to those in the first embodiment are denoted by the same reference signs, and the description thereof will be omitted as appropriate.

Figure 6:
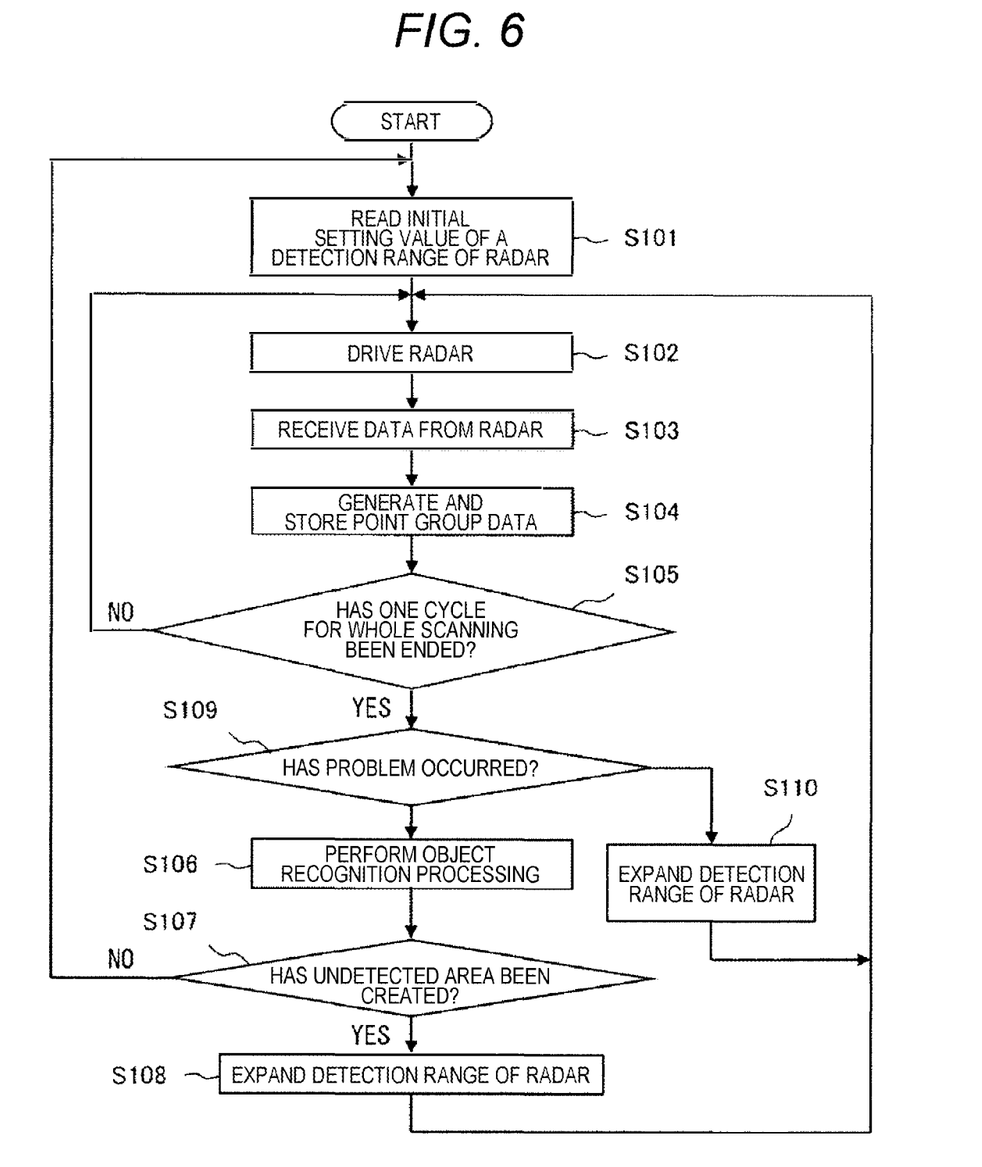
FIG. 6 is a flowchart illustrating a processing content of a control device according to a second embodiment of the present invention.
Figure 7:
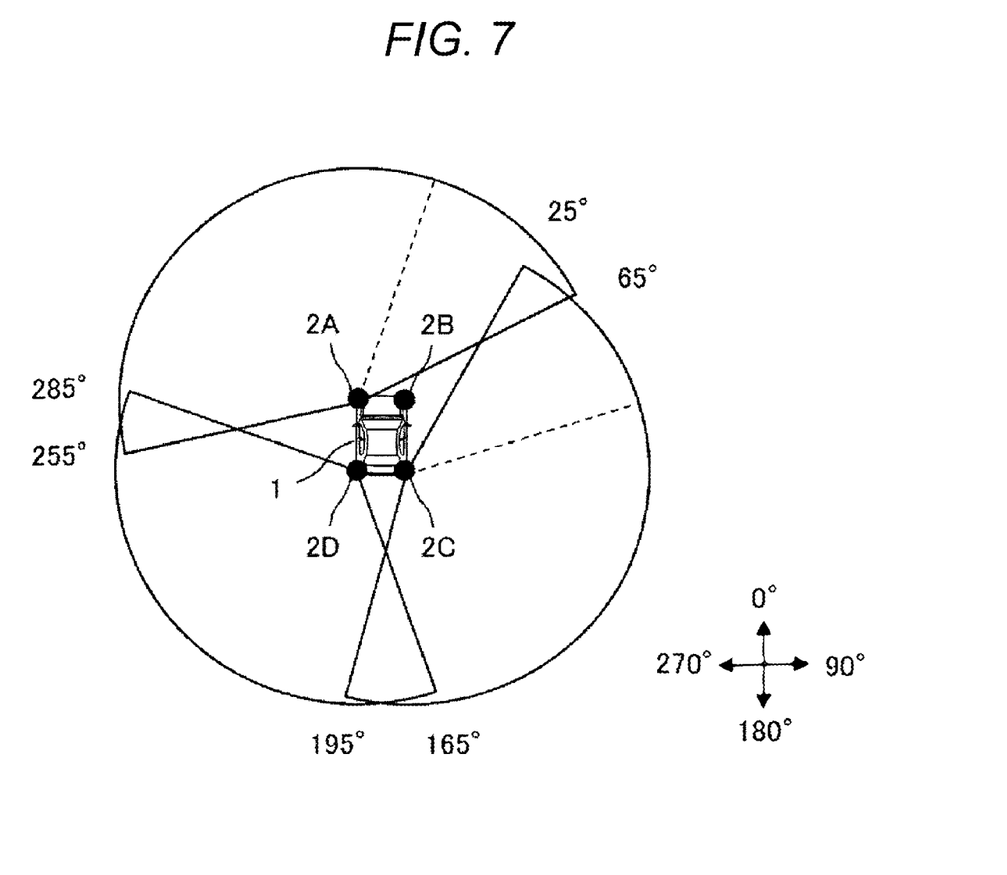
FIG. 7 is a top view of a vehicle illustrating a specific example of expanding a detection range of a laser radar in the second embodiment of the present invention.

FIG. 6 is a flowchart illustrating the processing content of the control device in the present embodiment. Since Steps S101 to S107 are the same as those in the first embodiment, the description thereof will be omitted as appropriate.

Until one cycle of the entire scanning by the laser radars 2A to 2D is completed, the determination in Step S105 becomes NO, and the processes in Steps S102 to S104 are repeated. When one cycle of the entire scanning by the laser radars 2A to 2D has been completed, the determination in Step S105 becomes YES, and the process proceeds to Step S109.

In Step S109, the data processing unit 6 in the control device 3 determines whether or not any of the laser radars 2A to 2D has a problem based on the data from the laser radars 2A to 2D. More specifically, when pieces of data from all the laser radars 2A to 2D can be received, and the values are valid, the data processing unit 6 determines that all the laser radars 2A to 2D do not have a problem. Thus, the determination in Step S109 is YES, and the process proceeds to Step S106.

On the other hand, for example, when the data from one of the laser radars 2A to 2D cannot be received or is not a valid value, the data processing unit 6 in the control device 3 determines that the one laser radar has a problem (in detail, failure or dirt adhesion, or the like). Thus, the determination in Step S109 is YES, and the process proceeds to Step S110. In Step S110, the radar control unit 5 in the control device 3 expands the detection range of another laser radar adjacent to the one laser radar so as to supplement the detection range of the one laser radar having a problem.

Specifically, for example, when the laser radar 2A has a failure, the detection range of the laser radar 2B is expanded to a range of 295° to 105°, and the detection range of the laser radar 2D is expanded to a range of 165° to 335°. For example, when the laser radar 2B has a problem, as illustrated in FIG. 7, the detection range of the laser radar 2A is expanded to a range of 255° to 65°, and the detection range of the laser radar 2C is expanded to a range of 25° to 195°. For example, when the laser radar 2C has a failure, the detection range of the laser radar 2B is expanded to a range of 345° to 155°, and the detection range of the laser radar 2D is expanded to a range of 115° to 285°. For example, when the laser radar 2D has a failure, the detection range of the laser radar 2C is expanded to a range of 75° to 245°, and the detection range of the laser radar 2A is expanded to a range of 205° to 15°.

Then, the radar control unit 5 in the control device 3 stores the changed setting value of the detection range of the laser radar in the radar control-information storage unit 4. Then, the process proceeds to Step S102. The radar control unit 5 drives the radars 2A to 2D based on the changed setting value or the initial setting value of the detection range of the laser radars 2A to 2D, which are stored in the radar control-information storage unit 4.

The data processing unit 6 in the control device 3 may invalidate the data from the laser radar having a problem, or may process the data from the other laser radar as having a lower accuracy than the data from the other laser radar.

Also in the present embodiment as described above, the same effect as those in the first embodiment can be obtained. Further, in the present embodiment, when one laser radar has a problem, it is possible to supplement the detection range of the one laser radar by expanding the detection range of another laser radar adjacent to the one laser radar. Therefore, it is possible to improve the object detection performance. When the undetected area is not created or the problem does not occur, the detection range of the laser radar is not expanded, so that it is possible to reduce the processing load of the control device 3.

Figure 11A:
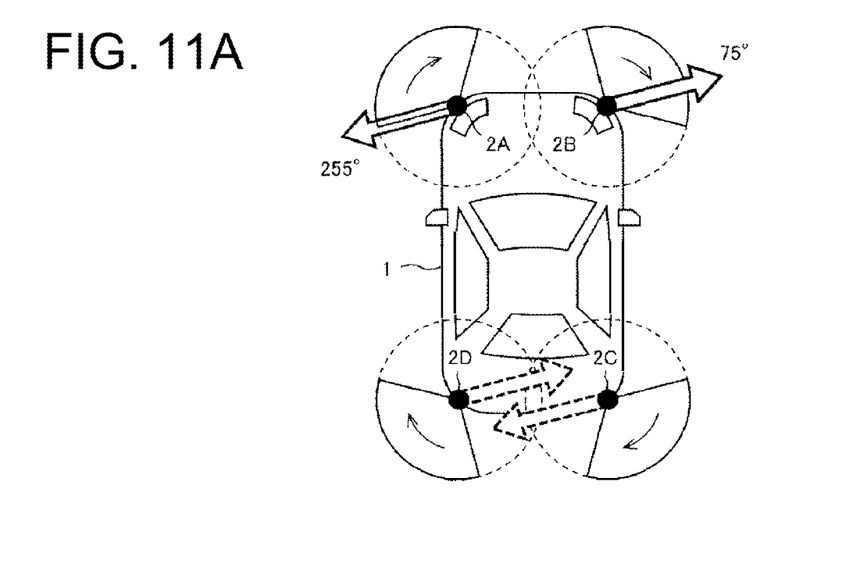
FIGS. 11A and 11B are top views of a vehicle for explaining a second scanning pattern in the third embodiment of the present invention.
Figure 11B:
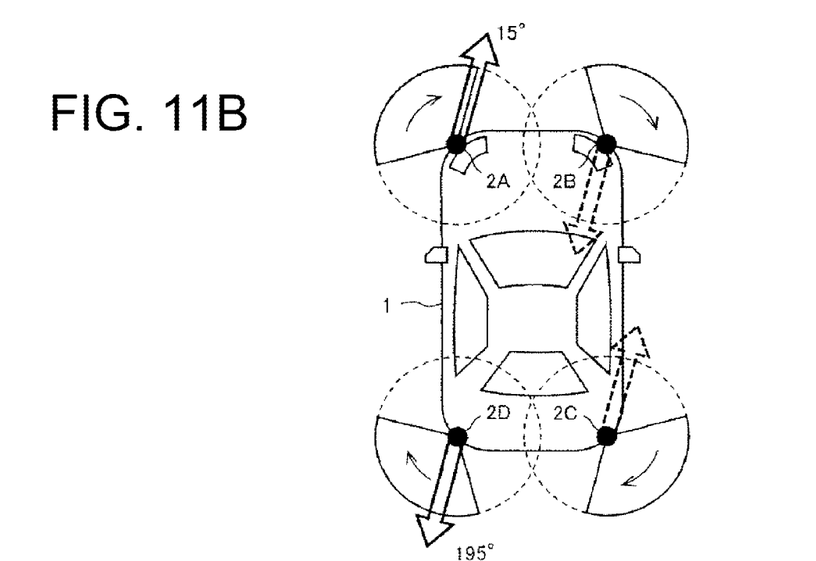

A third embodiment of the present invention will be described with reference to FIGS. 8 and 11. Note that, in the present embodiment, the portions equivalent to those in the first embodiment are denoted by the same reference signs, and the description thereof will be omitted as appropriate.

Figure 8:
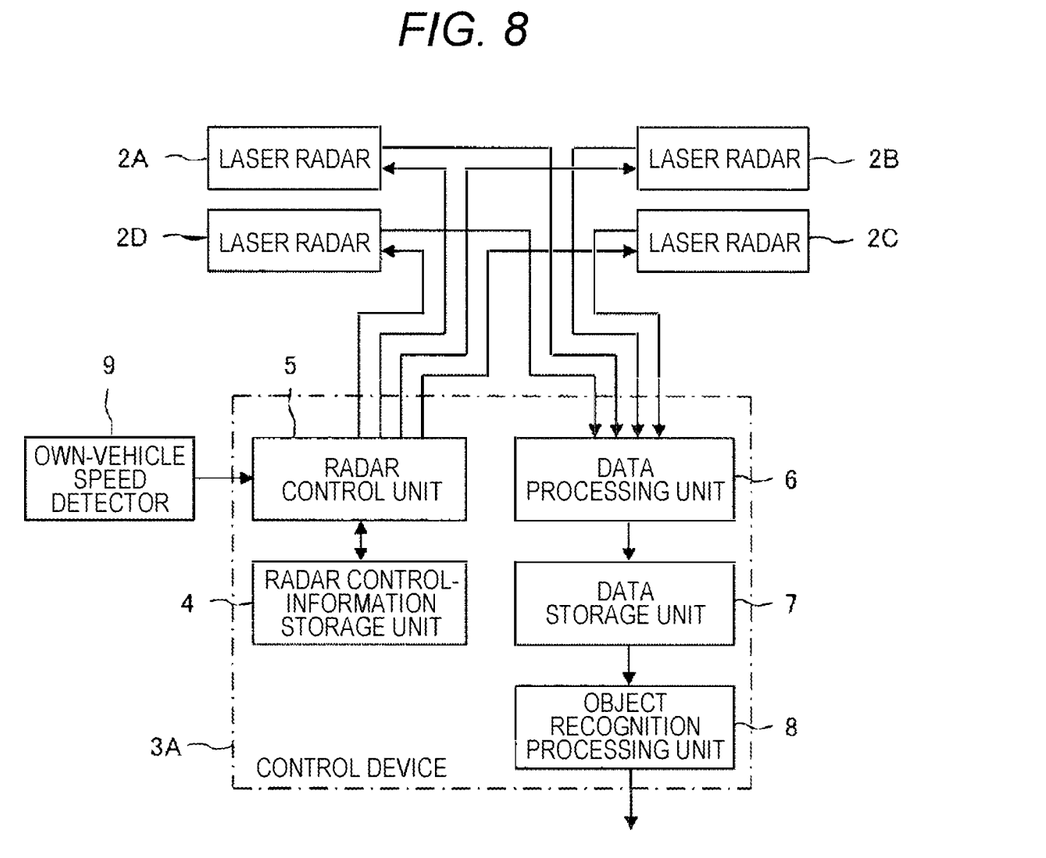
FIG. 8 is a block diagram illustrating a configuration of a vehicle-mounted radar system according to a third embodiment of the present invention.

FIG. 8 is a block diagram illustrating a configuration of a vehicle-mounted radar system according to the present embodiment.

In the present embodiment, a vehicle-mounted radar system is mounted on a vehicle 1, and includes, for example, four laser radars 2A to 2D, a control device 3A, and an own-vehicle speed detector 9.

The own-vehicle speed detector 9 detects the speed (own vehicle speed) of the vehicle 1 and outputs the detection result to the control device 3A. The radar control unit 5 in the control device 3A changes the scanning patterns of the laser radars 2A to 2D in accordance with the speed of the vehicle 1 detected by the own-vehicle speed detector 9.

Figure 9:
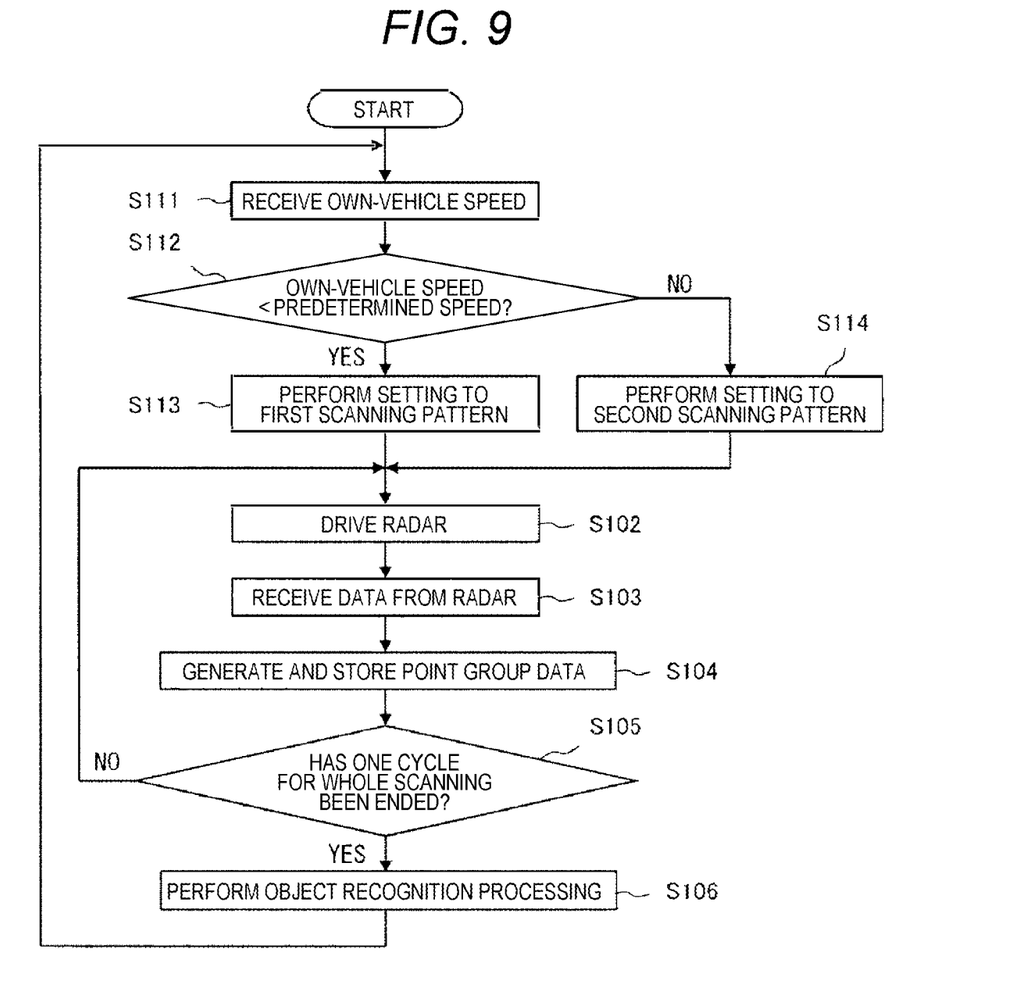
FIG. 9 is a flowchart illustrating a processing content of a control device in the third embodiment of the present invention.

Next, the processing content of the control device 3A in the present embodiment will be described. FIG. 9 is a flowchart illustrating a processing content of a control device in the present embodiment.

In Steps S111 and S112, the radar control unit 5 in the control device 3A receives an input of the speed of the vehicle 1 detected by the own-vehicle speed detector 9, and determines whether or not the speed is less than a preset predetermined speed. When the speed of the vehicle 1 is less than the predetermined speed, the determination in Step S112 is YES, and the process proceeds to Step S113. The radar control unit 5 sets a first scanning pattern and stores setting information in the radar control-information storage unit 4. On the other hand, when the speed of the vehicle 1 is equal to or higher than the predetermined speed, the determination in Step S112 is NO, the process proceeds to Step S114. The radar control unit 5 in the control device 3A sets a second scanning pattern and stores setting information in the radar control-information storage unit 4.

Then, until one cycle of the entire scanning by the laser radars 2A to 2D is completed, the determination in Step S105 becomes NO, and the processes in Steps S102 to S104 are repeated. Specifically, the radar control unit 5 in the control device 3A drives the laser radars 2A to 2D by the first scanning pattern or the second scanning pattern stored in the radar control-information storage unit 4. The data processing unit 6 in the control device 3 receives the data from the laser radars 2A to 2D, generates point group data based on the received data, and stores the generated data in the data storage unit 7.

When one cycle of the entire scanning by the laser radars 2A to 2D has been completed, the determination in Step S105 becomes YES, and the process proceeds to Step S106. In Step S106, the object recognition processing unit 8 in the control device 3 recognizes an object around the vehicle 1 based on the point group data stored in the data storage unit 7.

Next, the first and second scanning patterns described above will be described.

Figure 10A:
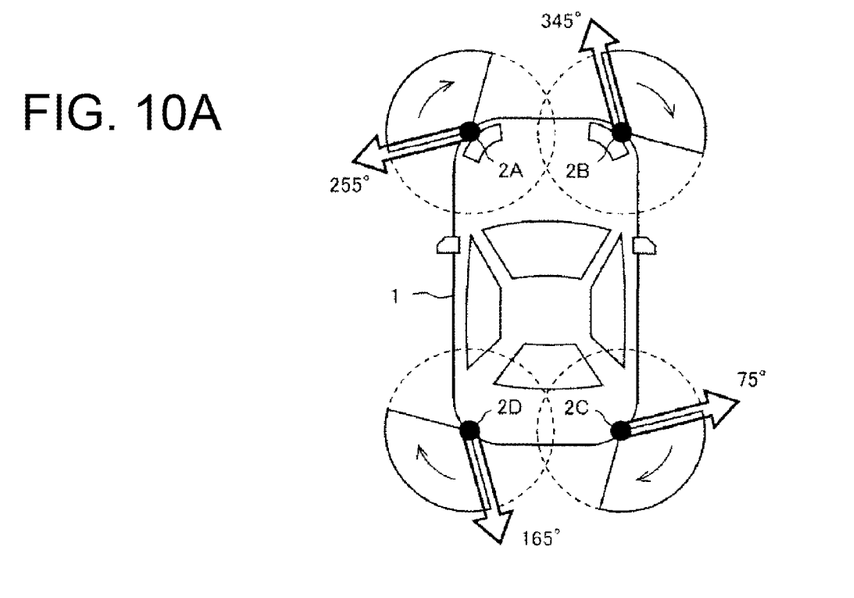
FIGS. 10A and 10B are top views of a vehicle for explaining a first scanning pattern in the third embodiment of the present invention.
Figure 10B:
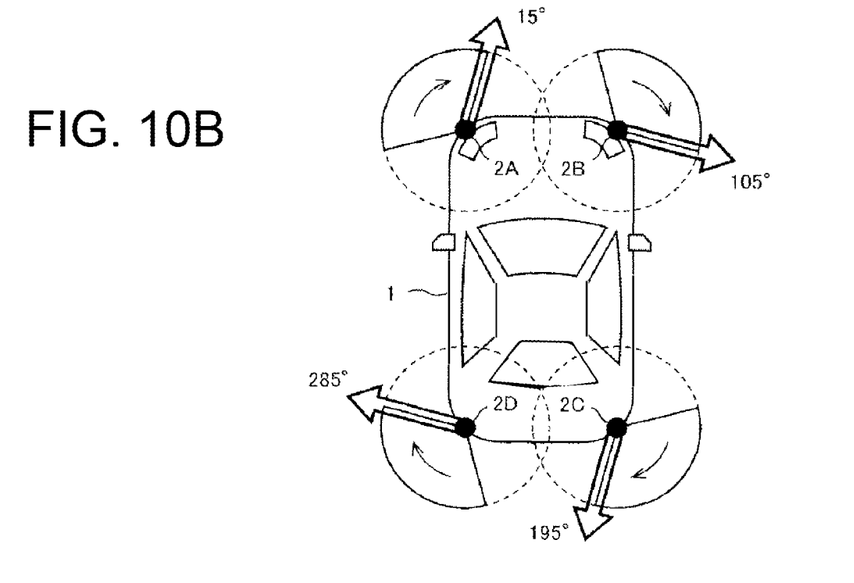

The first scanning pattern is a scanning pattern in which the scanning timings of the laser radars 2A to 2D are the same as each other. In the present embodiment, the rotation directions and rotation speeds of the rotation mechanisms of the laser radars 2A to 2D are the same, and the rotation phases are different by 90°. Specifically, as indicated by the solid line arrow in FIG. 10(a), when scanning of one cycle is started, the irradiation direction of the laser radar 2A is 255°, and the irradiation direction of the laser radar 2B is 345°. The irradiation direction of the laser radar 2C is 75°, and the irradiation direction of the laser radar 2D is 165°. As indicated by the solid line arrow in FIG. 10(b), when the scanning of one cycle is ended, the irradiation direction of the laser radar 2A is 15°, and the irradiation direction of the laser radar 2B is 105°. The irradiation direction of the laser radar 2C is 195°, and the irradiation direction of the laser radar 2D is 285°. In the first scanning pattern, it is possible to reduce the scanning time of one cycle. Therefore, it is possible to shorten the detection interval of objects around the vehicle 1.

In the second scanning pattern, the scanning timings of the laser radars 2A to 2D are different from each other, and the irradiation direction of one of the adjacent laser radars is the same as the irradiation direction of another laser radar with a delay of half a cycle of the entire scanning by the laser radars 2A to 2D. In the present embodiment, the rotation directions and rotation speeds of the rotation mechanisms of the laser radars 2A to 2D are the same, and the rotation phases are different by 180°. Specifically, as indicated by the solid line arrow in FIG. 11(a), when scanning of one cycle is started, the irradiation direction of the laser radar 2A is 255°, and the irradiation direction of the laser radar 2B is 75°. In a first stage of one-cycle scanning, the irradiation direction of the laser radar 2A is 285° and the irradiation direction of the laser radar 2B is 105°. In a second stage of one-cycle scanning, the irradiation direction of the laser radar 2A is 345° and the irradiation direction of the laser radar 2D is 165°. As indicated by the solid line arrow in FIG. 11(b), in a third stage of one cycle of scanning, the irradiation direction of the laser radar 2A is 15° and the irradiation direction of the laser radar 2D is 195° C. In a fourth stage of one-cycle scanning, the irradiation direction of the laser radar 2C is 75° and the irradiation direction of the laser radar 2D is 255°. In a fifth stage of one-cycle scanning, the irradiation direction of the laser radar 2C is 105° and the irradiation direction of the laser radar 2D is 285°. In a sixth stage of one-cycle scanning, the irradiation direction of the laser radar 2B is 345° and the irradiation direction of the laser radar 2C is 165°. In a seventh stage of one-cycle scanning, the irradiation direction of the laser radar 2B is 15° and the irradiation direction of the laser radar 2C is 195°. At the end of one cycle of scanning, the irradiation direction of the laser radar 2A is 255° and the irradiation direction of the laser radar 2B is 75°.

In the second scanning pattern, the scanning time for one cycle is longer than that in the first scanning pattern, but it is possible to equalize the intervals at which the laser radars 2A and 2B detect an object in front of the vehicle 1. Similarly, it is possible to equalize the intervals at which the laser radars 2C and 2D detect an object behind the vehicle 1. Similarly, the intervals at which the laser radars 2A and 2D detect an object on the left side of the vehicle 1 can be equalized. Similarly, the intervals at which the laser radars 2B and 2C detect an object on the right side of the vehicle 1 can be equalized.

As described above, in the present embodiment, when the vehicle 1 is stopped or traveling at a low speed, the laser radars 2A to 2D are controlled by the first scanning pattern, so that it is possible to shorten the detection interval of the objects around the vehicle 1. In addition, since the laser radars 2A to 2D are controlled by the second scanning pattern when the vehicle 1 is traveling at high speed, it is possible to equalize the detection intervals of the objects around the vehicle 1. Thus, it is possible to improve the accuracy of predicting the positional relationship between the vehicle 1 and the object can be improved. Therefore, it is possible to improve the object detection performance in accordance with the own-vehicle speed.

Note that, in the first to third embodiments, as an example, a case where each of the laser radars includes the irradiation unit that performs the irradiation with the laser beam and the rotation mechanism that rotates the irradiation unit, and the rotation angle of the irradiation unit and the presence or absence of irradiation of the laser beam is controlled to perform scanning on the surroundings of the vehicle 1 by changing the irradiation direction of the laser beam is described. The present invention is not limited thereto. Each of the laser radars may include an irradiation mirror that changes the irradiation direction of the laser beam and a rotation mechanism that rotates the irradiation mirror. The laser radar may control the rotation angle of the irradiation mirror and control whether or not the irradiation with the laser beam is performed, so as to perform scanning on the surroundings of the vehicle 1 by changing the irradiation direction of the laser beam.

Figure 12:
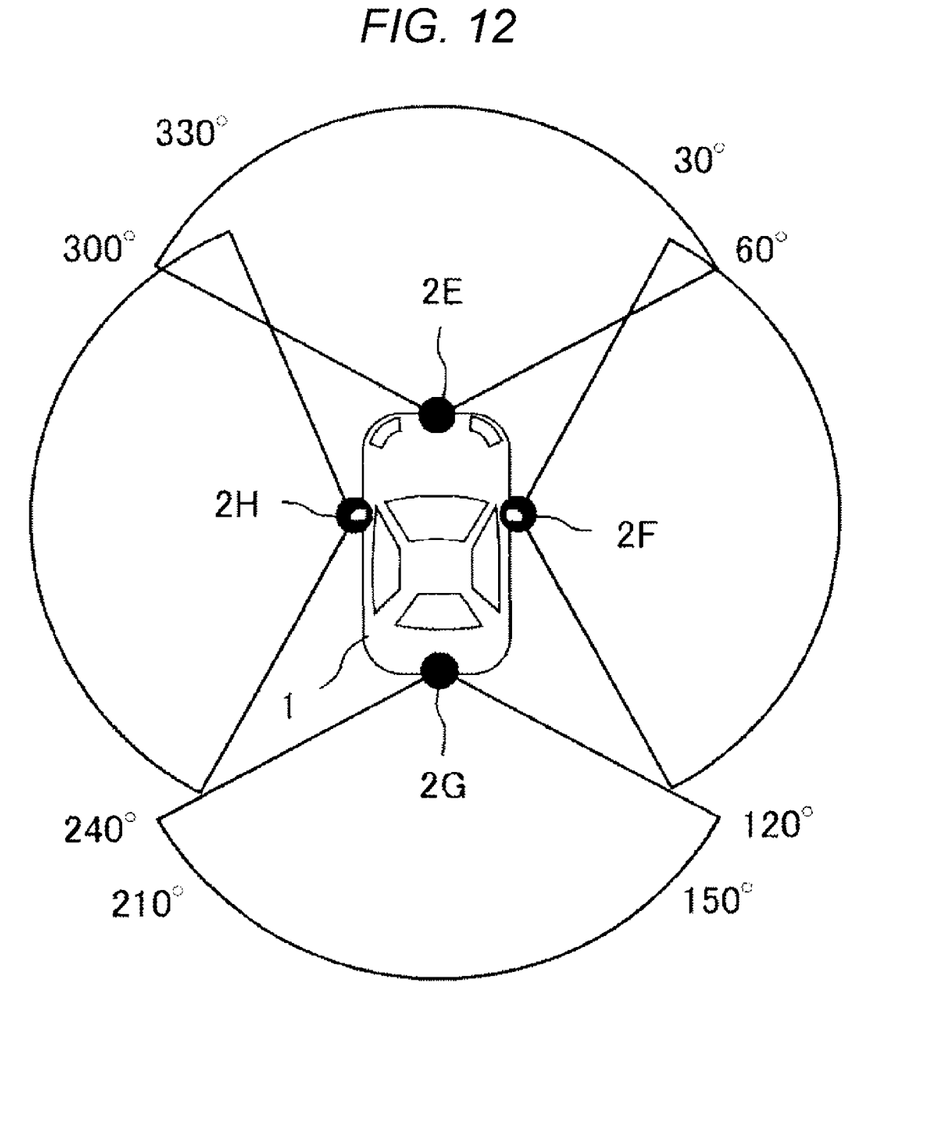
FIG. 12 is a top view of a vehicle illustrating an arrangement and a detection range of a laser radar in a first modification example of the present invention.

Further, in the first to third embodiments, as an example, a case where the laser radars 2A, 2B, 2C, and 2D are arranged at the front left corner portion, the front right corner portion, the rear right corner portion, and the rear left corner portion of the vehicle 1, respectively is described. The present invention is not limited thereto. For example, as in a first modification example illustrated in FIG. 12, laser radars 2E, 2F, 2G, and 2H may be arranged at the front, right, rear, and left portions of the vehicle 1, respectively. For example, the initial value of the detection range of the laser radar 2E is 330° to 60°. The initial value of the detection range of the laser radar 2F is 30° to 150°. The initial value of the detection range of the laser radar 2G is 120° to 240°. The initial setting of the detection range of the laser radar 2H is 210° to 330°. The present invention can be applied to such a modification example.

Figure 13:
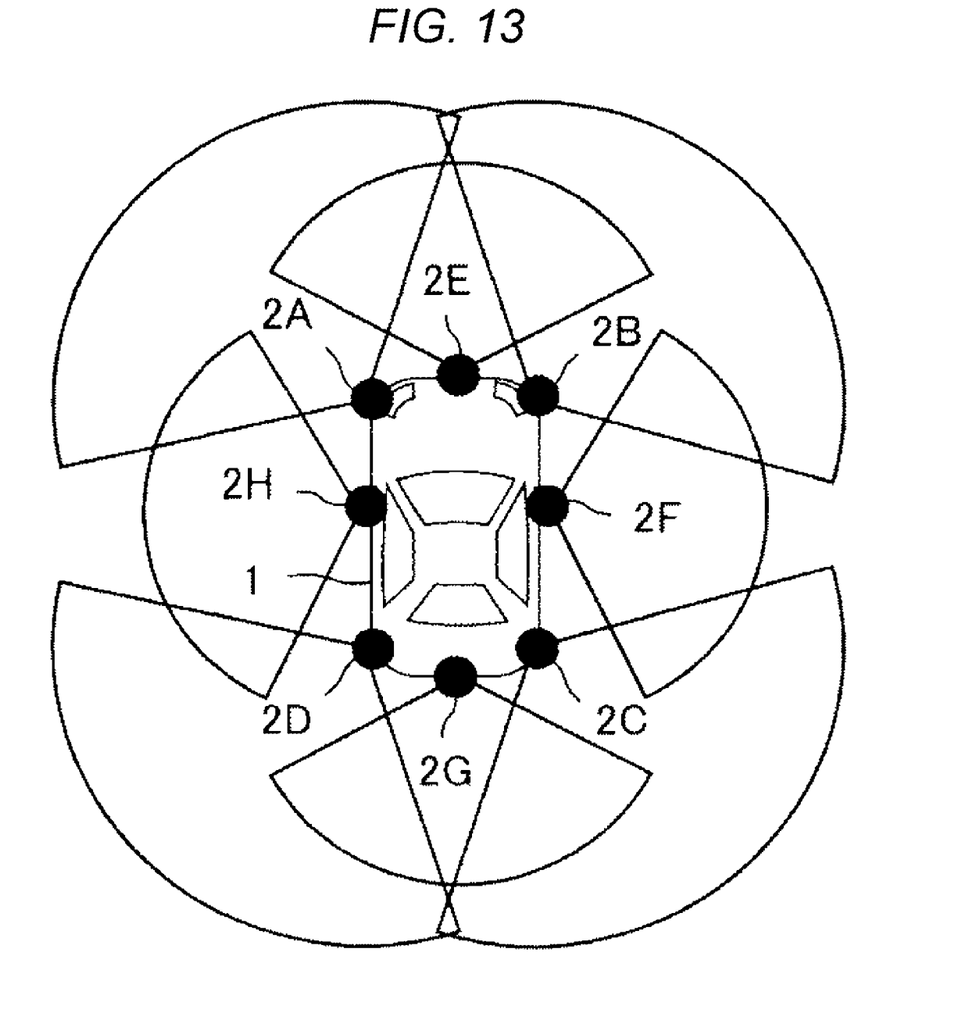
FIG. 13 is a top view of a vehicle illustrating the arrangement and the detection range of the laser radar in a second modification example of the present invention.
Figure 14:
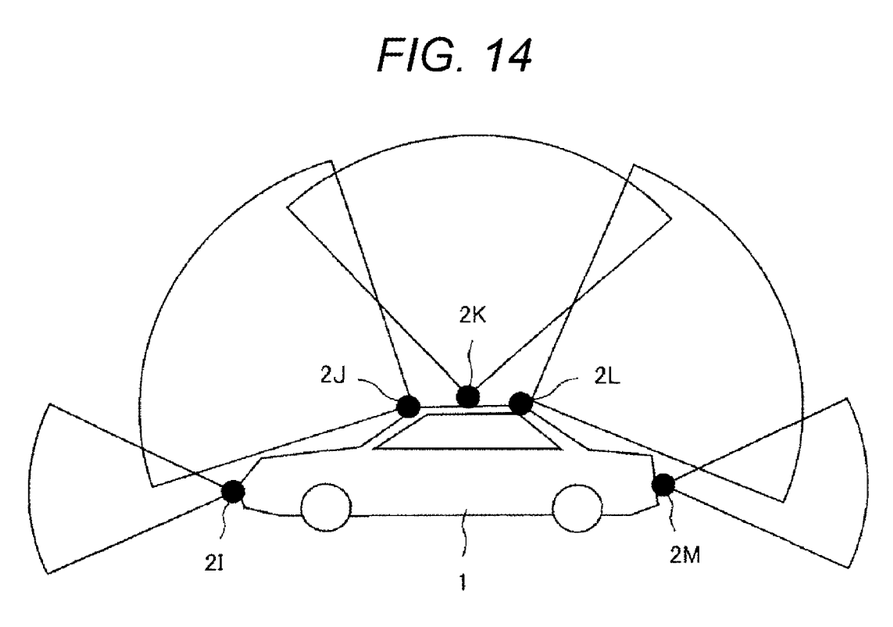
FIG. 14 is a side view of a vehicle illustrating the arrangement and detection range of the laser radar in a third modification example of the present invention.

Further, in the first to third embodiments and the first modification example, as an example, a case where the vehicle-mounted radar system is provided with four laser radars for detecting the entire circumference of the vehicle 1 is described. The present invention is not limited thereto. For example, as in a second modification example illustrated in FIG. 13, the vehicle-mounted radar system may include eight laser radars 2A to 2H. Further, although not illustrated, for example, only a plurality of laser radars for detecting an object on the front side of the vehicle 1 or only a plurality of laser radars for detecting an object on the rear side of the vehicle 1 may be provided. The present invention can also be applied to the modification examples.

Further, in the first and second embodiments and the first and second modification examples, a case where the plurality of laser radars are arranged so as to be dispersed in the horizontal direction is described as an example, but the present invention is not limited to this. Modification can be made without departing from the spirit and technical idea of the present invention. That is, for example, as in a third modification example illustrated in FIG. 13, a plurality of laser radars 2I, 2J, 2K, 2L, 2M may be arranged so as to be dispersed in a vertical direction. Then, as in the first embodiment, in the control device 3, when the laser beam of one of the plurality of laser radars 2I, 2J, 2K, 2L, 2M may be blocked by an object, and thus an undetected area is generated, the detection range of another laser radar adjacent to the one laser radar may be expanded so that at least a portion of the undetected area can be detected. Further, as in the second embodiment, when one of the plurality of laser radars 2I, 2J, 2K, 2L, 2M has a problem, the control device 3 may expand the detection range of another laser radar adjacent to the one laser radar so as to supplement the detection range of the one laser radar.

REFERENCE SIGNS LIST

1 vehicle
2A-2M laser radar
3, 3A control device
9 own-vehicle speed detector
10 other vehicle (object)
11 undetected area
12 object

The invention claimed is:

1. A vehicle-mounted radar system comprising:
a plurality of laser radars that irradiate a surrounding of a vehicle with a laser beam and receive light reflected by an object around the vehicle; and
a control device that controls the plurality of laser radars and recognizes the object based on light reception results of the plurality of laser radars,
wherein the control device
determines whether or not the laser beam of any of the plurality of laser radars is blocked by the object, and thus an undetected area is created, based on a recognition result of the object, and
when the laser beam of one of the plurality of laser radars is blocked by the object, and thus the undetected area is created, expands a detection range of another laser radar adjacent to the one laser radar so that at least a portion of the undetected area is allowed to be detected.

2. The vehicle-mounted radar system according to claim 1, wherein the control device
determines whether or not a problem occurs in any of the plurality of laser radars, based on the light reception results of the plurality of laser radars, and
when the problem occurs in one of the plurality of laser radars, expands the detection range of another laser radar adjacent to the one laser radar so as to supplement the detection range of the one laser radar.

3. A vehicle-mounted radar system comprising:
a plurality of laser radars that receive light reflected by an object around a vehicle while scanning a surrounding of the vehicle by changing an irradiation direction of a laser beam; and
a control device that controls the plurality of laser radars and recognizes the object based on light reception results of the plurality of laser radars, the system further comprising
an own-vehicle speed detector that detects a speed of the vehicle,
wherein the control device
when the speed of the vehicle detected by the own-vehicle speed detector is less than a predetermined speed set in advance, controls the plurality of laser radars in a first scanning pattern in which scanning timings of the plurality of laser radars are the same, and
when the speed of the vehicle detected by the own-vehicle speed detector is equal to or more than the predetermined speed, controls the plurality of laser radars in a second scanning pattern in which the scanning timings of the plurality of laser radars are different from each other, and an irradiation direction of one of adjacent laser radars is the same as an irradiation direction of another laser radar with a delay of half a cycle of an entire scanning by the plurality of laser radars.

* * * * *